United States Patent [19]

Mueller

[11] 4,348,885
[45] Sep. 14, 1982

[54] METHOD AND SYSTEM FOR OPERATIONAL TESTING OF A DEVICE FOR BALANCING BODIES OF ROTATION

[75] Inventor: H. Richard Mueller, Lynchburg, Va.

[73] Assignee: Gebr. Hofmann GmbH & Co. KG, Maschinenfabrik, Darmstadt, Fed. Rep. of Germany

[21] Appl. No.: 215,703

[22] Filed: Dec. 12, 1980

[51] Int. Cl.³ .............................................. G01M 1/22
[52] U.S. Cl. ........................................ 73/1 B; 73/462
[58] Field of Search .......................... 73/1 B, 462, 487

[56] References Cited

U.S. PATENT DOCUMENTS

| | | | |
|---|---|---|---|
| 4,046,017 | 9/1977 | Hill | 73/462 |
| 4,162,634 | 8/1979 | Hofmann | 73/462 |
| 4,173,146 | 11/1979 | Kögler | 73/462 |

*Primary Examiner*—James J. Gill
*Attorney, Agent, or Firm*—Fleit & Jacobson

[57] ABSTRACT

A method and system for operational testing of a device for the balancing of a rotor in two balancing planes, wherein the device is provided with a clamping fixture, a housing, and pickups for bracing the clamping fixture in relation to the housing, the device further including a computing unit for measuring the unbalance of the rotor, and for computing and indicating a size and direction of the unbalance. The method and system further call for the device to be provided with a weight of known size mounted in the housing, the weight being removed from the housing when operational testing of the device is desired. Upon removal of the weight of known size from the housing, data corresponding to the geometric measurement of the position of the weight as mounted on the clamping fixture are automatically entered into the computing unit. Further features of the inventive method and/or system reside in the provision of adjustment means for adjusting voltage indications of the magnitude of unbalance, angular position of unbalance, and pickup voltages.

19 Claims, 4 Drawing Figures

METHOD AND SYSTEM FOR OPERATIONAL TESTING OF A DEVICE FOR BALANCING BODIES OF ROTATION

BACKGROUND OF THE INVENTION

1. Field of the Invention

The present invention relates to a method and system for the operational testing of a device for the balancing of bodies of rotation, and more specifically to a method and system for the operational testing of a device for the balancing of a rotor (in particular, automobile wheels) in two balancing planes.

2. Description of the Prior Art

Devices for the balancing of out-of-balance rotor bodies are known in the art, and have varying designs.

For example, German Pat. No. 27 32 738 discloses such a device for the balancing of a rotor in two balancing planes. As the rotational body is rotated, forces are applied to pickup devices provided in the device, and the pickup devices translate the applied forces to corresponding dimensions in the plane of the rotating body.

A second device or apparatus for balancing rotors is disclosed in U.S. Pat. No. 4,162,634, assigned to the assignee of the present invention. The latter patent discloses a method and apparatus for balancing a rotor in at least one plane, geometrical parameters of the rotor being stored along with test values representing the rotor in balance as determined during a test run. The stored values are transmitted to a computer which determines the size and phase relationship of counterweights necessary to balance the rotor. Both dynamic and static unbalance are displayed on appropriate indicators of the device.

A further wheel balancing apparatus is disclosed in U.S. Pat. No. 4,046,017. Of particular interest is the fact that, as stated in the patent, wheels to be balanced may vary in diameter and in width, and the positions of the inner and outer rims of the wheel may vary in offset distance from the bearing housing. Accordingly, the apparatus of the latter U.S. patent is provided with dials for providing the computing unit with the following wheel-related parameters: the diameter (or radius) of the inner and outer wheel rims; the width of the wheel (that is, the distance between the inner wheel plane and the outer wheel plane); and the offset distance from a force transducer or pickup device to the inner wheel rim.

In devices of the kind discussed above, the rotor or wheel is typically mounted on a clamping fixture or shaft, the clamping fixture being braced directly, or by means of measuring value loggers, in relation to the housing of the device. In addition, such devices are provided with unbalance-measuring devices for determining the magnitude and direction of unbalance.

For the purpose of adjusting or calibrating such balancing devices, typical prior art techniques call for a completely balanced rotor to be fixed to the clamping fixture, and an artificial unbalance is generated by the addition of a known weight to the rotor. The unbalance supplied is then measured in a test run by means of an unbalance-measuring device, the magnitude and phase relationship being measured, and indicating instructions being employed for manual adjustment of the balancing machine.

In such prior art arrangements, prior to the actual measuring test run, the computing unit must be mutually adjusted so as to provide it with the geometric dimensions of the rotor. In that regard, the typical technique calls for scanning of the rotor, either manually or automatically, to find the values of the geometric dimensions of the rotor to be employed in the test run. The values thus determined are provided to the computing device. Such a scanning and adjusting process requires considerable time, and may in fact be the source of faulty adjustments (due to human error, and the like). In addition, such a technique of the prior art requires that a completely balanced rotor be available. Moreover, the arrangement and manipulation of such a completely balanced rotor is complicated and time-consuming.

SUMMARY OF THE INVENTION

Therefore, according to the present invention, there is provided a method and system for the operational testing of a device for the balancing of bodies of rotation, and more particularly, a method and system for operational testing of a device for the balancing of a rotor in two balancing planes.

More specifically, the method of the present invention comprises the step of providing the device in question with a clamping fixture and a housing, as well as pickups for bracing the clamping fixture in relation to the housing and a computing unit for measuring unbalance of the rotor and for computing and indicating a size and direction of the unbalance. The method further comprises the steps of providing the device with a weight of known size mounted on the housing, removing the weight from the housing, mounting the weight at a predetermined axial and radial location on the clamping fixture, and automatically entering data corresponding to the predetermined axial and radial location of the weight on the clamping fixture into the computing unit, the automatic entry of the data being accomplished simultaneously with the removal of the weight from the housing.

The inventive system for operational testing of a device for the balancing of a rotor in two balancing planes includes pickups for bracing a clamping fixture in relation to a housing of the device, and developing pickup signals corresponding to unbalance of the rotor, and a computing unit responsive to the pickup signals for computing and indicating a size and direction of the unbalance. The device is provided with a weight of known size mounted on the housing, the known weight being removable from the housing and mountable on the clamping fixture. The system further comprises automatic means responsive to removal of the weight from the housing for automatically entering data corresponding to the predetermined axial and radial location of the weight on the clamping fixture into the computing means. Further features of the inventive system, as described in detail below, include the provision of storage elements containing numerical and/or resistance values corresponding to the geometrical measurements of the position of the known weight mounted on the clamping fixture, such storage elements being implemented (in one embodiment) by a plurality of resistors having resistance values corresponding to the geometric measurement of the position of the weight as mounted on the clamping fixture.

In a preferred embodiment, the device is provided with a bore, and the weight of known size comprises a closure which, when removed from the bore, actuates a switch arrangement so as to automatically connect the storage elements (resistors) to the computing means.

Furthermore, a preferred embodiment of the invention includes the provision, within the bore, of various adjusting devices for fine setting or calibrating the voltages supplied by the pickups, the magnitude-of-unbalance indication, and the angular-position-of-unbalance indication. Finally, the weight of known size or closure is provided with external threads which match corresponding internal threads provided in the bore, thus facilitating insertion and removal of the weight with respect to the bore.

Therefore, is an object of the present invention to provide a method and system for the operational testing of a device for the balancing of bodies of rotation, and more specifically a method and system for the operational testing of a device for the balancing of a rotor in two balancing planes.

It is an additional object of the present invention to provide a method and system wherein, in response to removal of a known weight from the housing of a device for the purpose of mounting the known weight on a clamping fixture of the device, data corresponding to the predetermined axial and radial location of the weight on the clamping fixture are automatically entered into a computing unit of the system.

It is an additional object of the present invention to provide a method and system wherein storage elements or resistors are provided for entering the data corresponding to the predetermined axial and radial location of the weight on the clamping fixture into the computing unit.

It is an additional object of the present invention to provide a system wherein the device is provided with a bore, and wherein the weight of known size comprises a closure of the bore.

It is an additional object of the present invention to provide a system wherein the automatic means for entering data corresponding to the location of the weight on the clamping fixture comprises a switch arrangement provided in the bore.

It is an additional object of the present invention to provide a system wherein the means for automatically entering data corresponding to the location of the weight on the clamping fixture comprises a switch arrangement which is responsive to removal of the weight or closure from the bore for automatically connecting a plurality of resistors, having resistance values corresponding to the geometric measurements of the position of the weight as mounted on the clamping fixture, to the computing means.

It is a further object of the present invention to provide a system wherein one or more adjusting elements are provided, within the bore, for adjusting any one of the voltages supplied by the pickups, the magnitude-of-unbalance indication, and the angular-position-of-unbalance indication. The above and other objects that will hereinafter appear, and the nature of the invention, will be more clearly understood by reference to the following description, the appended claims, and the accompanying drawings.

DETAILED DESCRIPTION

The present invention will now be more fully described with reference to FIG. 1, which depicts a device for balancing rotors with a weight in place on the clamping fixture.

Figure 1:
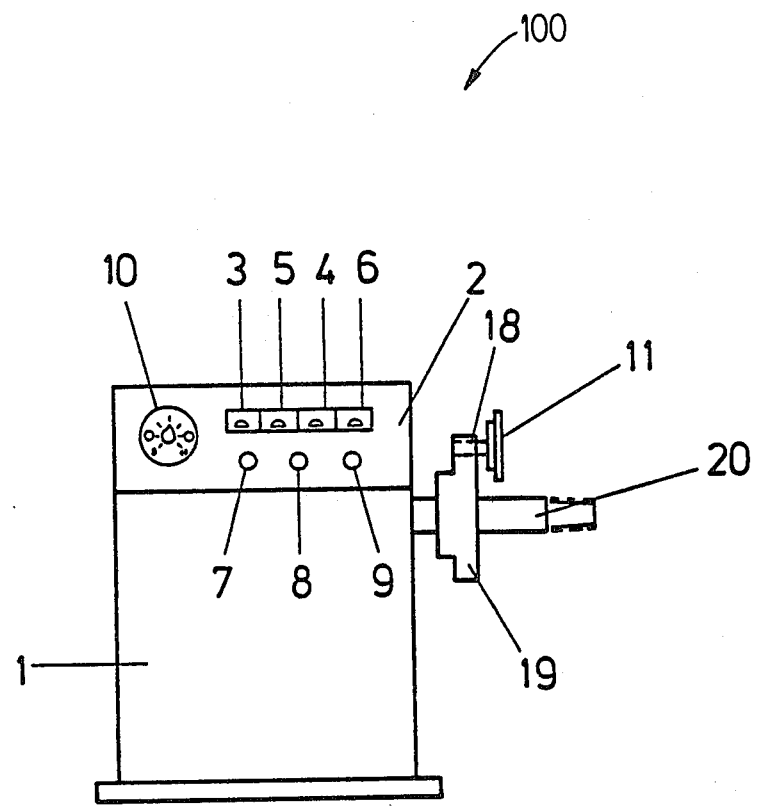
FIG. 1 depicts a device for balancing rotors with a weight in place on the clamping fixture.

As seen in FIG. 1, a device 100 for the balancing of a rotor in two balancing planes generally comprises a housing 1 and a switching board 2. The switching board 2 is provided with instruments or meters 3, 4 indicating magnitude of unbalance in the left and right balancing planes, respectively, and further instruments or meters 5, 6 indicating angles of unbalance in the left and right balancing planes, respectively. Of course, as is obvious, it is possible to include merely two instruments or meters on the switching board 2 for indicating magnitude and angular position, respectively, of unbalance by providing an appropriate change-over switch so as to selectively connect the instruments or meters for measurement in the left balancing plane or the right balancing plane. In addition, it is also obvious that the instruments or meters 3-6 can be of the analog or digital type.

The switching board 2 of the device 100 also includes setting devices 7, 8 and 9 for operator input of geometrical dimensions of a rotor to be balanced. For example, by means of setting device 7, the distance from a fixed point on the housing to the left balancing plane (that is, the plane of the left or inner rim of the rotor) can be entered. Similarly, by means of setting device 8, the distance between the left and right planes of the rotor can be entered, while, by means of setting device 9, the diameter (or radius) of the rotor can be entered. Of course, as is obvious, it is possible to replace the setting devices 7, 8 and 9 with appropriate keys for the digital input of geometrical measurements into an electronic measuring device (such as one equipped with a microprocessor).

As further seen in FIG. 1, the device 100 also comprises a clamping fixture or shaft 20 which is braced in relation to the housing 1 by means of devices (not shown) which log the measured values during operational rotation of a rotor to be balanced or during operational testing of the device by rotation of a known weight. Such logging devices, as well as the measurement electronics associated therewith for finding the magnitude and direction of unbalance, are known to those of skill in the art in this technology. For example, such logging devices could be implemented by elements 10 and 18 shown in FIG. 1 of the aforementioned German Pat. No. 27 32 738. Moreover, the measurement electronics associated therewith could be easily implemented by one of skill in the art, as evidenced by the disclosures of aforementioned U.S. Pat. Nos. 4,046,017 and 4,162,634.

The switching board 2 of the device 100 of FIG. 1 is further provided with a bore 10 which is so dimensioned as to be able to be covered by means of a weight or closure 11. For example, the bore 10 may be provided with internal threads corresponding to external threads located on the periphery of the weight 11. Thus, the weight 11 can be stored, when not being used for test rotation, in the bore 10 of the switching board 2. Conversely, the weight 11 can then be unscrewed from the bore 10 and mounted, via the bore 18, on the clamping device 19 of the clamping shaft or fixture 20. As mentioned above, the weight 11 is removed from the bore 10 and mounted on the clamping device 19 in order to operationally test the device, that is, for the purpose of calibrating the device prior to use or further use for actual balancing of rotors in need of balance.

Figure 2:
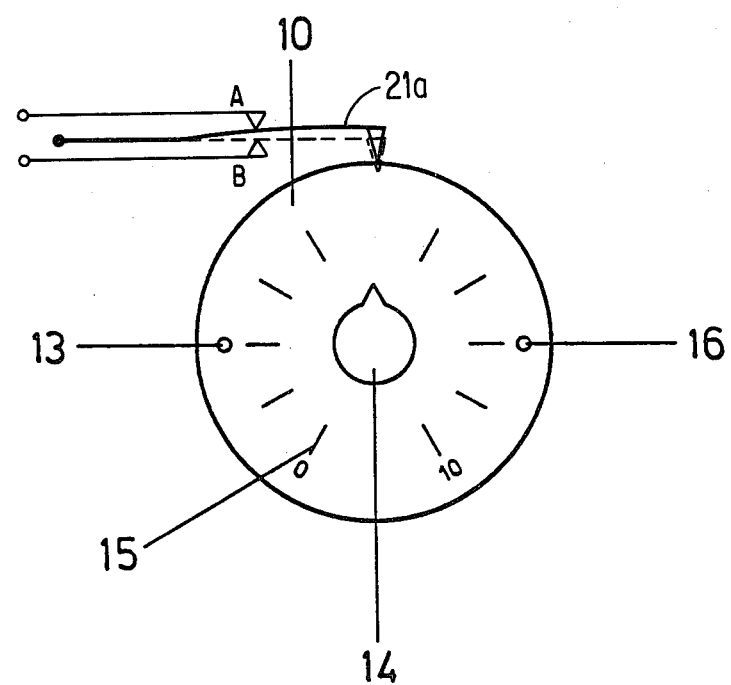
FIG. 2 depicts a portion of a switching board with a bore, and with pertinent setting devices.

FIG. 2 depicts the bore 10 located on the switching board 2 of the device 100 of FIG. 1.

As seen in FIG. 2, within the bore 10 there is provided a setting device 13 for adjusting the voltages provided by the logging devices (not shown, but discussed above), such logging devices providing electrical indications of measured values of unbalance to the measurement electronics (also not shown, but discussed above). In this manner, it is possible to achieve a perfect separation between measurements derived from each of the two balancing planes so that there will be no interaction therebetween.

As also seen in FIG. 2, a further setting device 14 is provided for adjustment of the voltage indication representing the magnitude of unbalance. A graduated scale 15 (ranging, for example, from 0 to 10) is engraved in the bore 10 to provide a frame of reference for use by the operator in making adjustments via setting device 14. Finally, a further setting device 16 is provided for adjustment of the voltage indication of angular position of unbalance. This setting device 16 may be designed, for example, in the form of a phase-shifter.

It is to be noted that the setting device 14 is for use in general calibration or adjustment of the device, whereas the setting devices 13 and 16 (typically, screwdriver-adjustable screws) are for use in more accurate calibration or adjustment of the device.

Finally, associated with the bore 10 is a conductive spring-like element 21a which, when bore 10 is in place, electrically contacts a contact A, and which, when bore 10 is removed, electrically contacts a further contact B.

Figure 3:
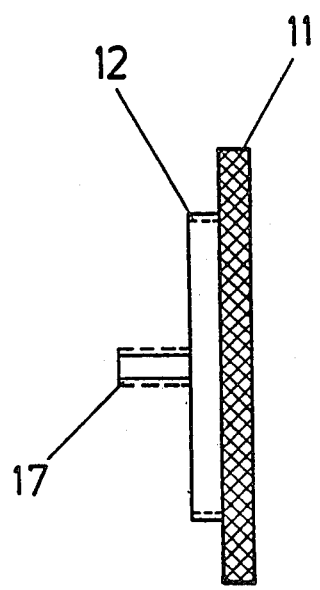
FIG. 3 is a side view of a weight mounted on a clamping fixture, as shown in FIG. 1.

FIG. 3 is a side view of the weight 11 shown in FIG. 1. As seen therein, the weight 11 comprises an attachment 17 by means of which the weight 11 is secured, as a result of being screwed into a bore 18, to the clamping device 19 of the clamping shaft or fixture 20. In this manner, the weight 11 is precluded from experiencing a fixation of the body of rotation (in particular, of the wheel of an automobile to be balanced), thus preventing faulty measurements. Finally, the weight 11 also has external threads 12 which, as previously mentioned, match internal threads (not shown) in the bore 10 of the device 100 of FIG. 1, thus facilitating mounting of the weight 11 in the bore 10 when the weight 11 is no longer needed for calibration-type adjustment of the device 100.

Figure 4:
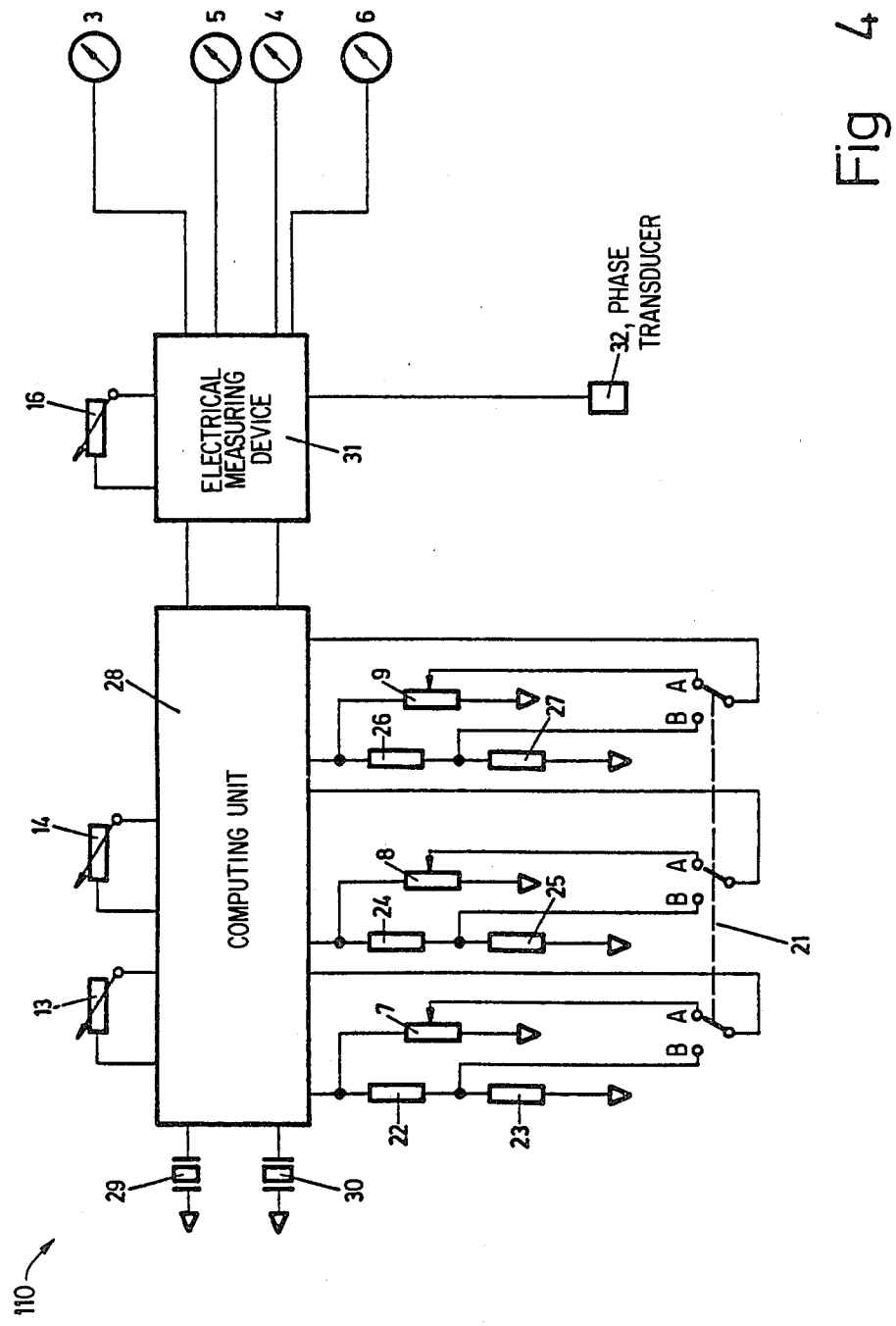
FIG. 4 is a schematic diagram of a circuit employed in accordance with the method and system of the present invention.

FIG. 4 is a schematic diagram of a circuit for use in accordance with the method and system of the present invention. As seen therein, the circuit 110 comprises a plurality of ganged switches 21 connected to fixed resistors 22 through 27, and also connected to the setting devices 7 through 9 (FIG. 1), the switches 21 being further connected to a computing unit 28. Also connected to the computing unit 28 are the setting devices 13 and 14 (FIG. 2), as well as test data receivers 29 and 30 for receiving voltages proportional to unbalance from pickups (not shown, but discussed above with reference to FIG. 1).

The circuit 110 of FIG. 4 also includes an electrical measuring device 31, to which are connected to the setting device 16 (FIG. 2) and a phase transducer 32 for determining the angle of the position of unbalance, and to which are further connected instruments or meters 3 through 6 (FIG. 1) for displaying the magnitude and angle of unbalance with respect to the left and right balancing planes, respectively.

It is to be noted that the computing unit 28 is a known unit for computing, in a conventional manner, the magnitude and angle of unbalance in the left and right balancing planes, respectively. Such computations or calculations are, for example, of the type disclosed in German Pat. No. 12 05 734. A computing unit similar to that of FIG. 4 is also shown in U.S. Pat. No. 4,046,017 (force computer 56 of FIGS. 2 and 3), as well as in U.S. Pat. No. 4,162,634 (frame computer 22).

In addition, it is to be noted that the electrical measuring element 31 is also a conventional device for converting the computed values provided by computing unit 28 to a form appropriate for driving the instruments or meters 3 through 6. Thus, electrical measuring element 31 may include amplifiers and filters forming a meter driving circuit. For example, such filters and amplifiers are disclosed in U.S. Pat. No. 4,046,017 (see filters 60a, 60b and amplifiers 73, as well as D-A converters 86a, 86b and position meter driving circuits 88a, 88b).

With reference to FIGS. 2 and 4, in operation, the weight 11 is unscrewed from the bore 18 when it is desired to mount the weight 11 as a known weight on the clamping shaft or fixture 20. So long as the weight 11 remains screwed into the bore 10 (see FIG. 2), a spring-like element 21a remains in position A. This results, as a result of conventional solenoid or switching techniques, in maintaining switch 21 (FIG. 4) in its rightmost corresponding position A. As a result, variable setting devices (resistors) 7 through 9 may be used by the operator to provide the geometric dimensions of a rotor to be balanced to the computing unit 28.

However, upon removal of the weight 11 from the bore 10 for the purpose of calibration/adjustment of the balancing machine 100, the spring-like element 21a returns to its normal position B (FIG. 2), with the result that switch 21 (FIG. 4) returns to its leftmost corresponding position B. As a result, the computing unit 28 is connected to the junctions between voltage dividing resistors 22 and 23, 24 and 25, and 26 and 27, respectively. Resistors 22 through 27 have fixed resistance values corresponding to the geometric dimensions of the weight 11 when positioned on the clamping shaft or fixture 20 for the purpose of calibration/adjustment of the balancing machine 100.

Thus, whereas in prior art arrangements it was necessary for the operator to manually enter the geometric measurements for the weight 11 (by utilizing setting devices 7 through 9), in accordance with the present invention, removal of the weight 11 from the bore 10 results in automatic entry of geometric measurements, provided by resistors 22 through 27, into the computing unit 28. As previously stated, this automatic feature results in substantial savings in time (since manual or automatic scanning of the rotor is precluded), reduction in complexity, and reduction in the probability of erroneous entries (as might result from manual entry via setting switches 7 through 9).

During a test measuring run, with the weight 11 placed on the clamping device 19 (FIG. 1), certain predetermined values for magnitude and angle of unbalance in the left and right balancing planes, respectively, should be indicated on indicating devices 3 through 6. In the case of any deviation from such values, adjustment can take place by means of adjusting of setting devices 13 and 14 and/or 16, without the necessity of first finding the geometrical measurements of the position of the weight 11 relative to the clamping device 19. In this manner, faulty settings are prevented.

While preferred forms and arrangements have been shown in illustrating the invention, it is to be clearly understood that various changes in detail and arrangement may be made without departing from the spirit and scope of this disclosure.

What is claimed is:

1. In a method for operational testing of a device for the balancing of a rotor in two balancing planes, comprising the steps of:
   (a) providing the device with a clamping fixture and a housing,
   (b) providing said device with pickups for bracing said clamping fixture in relation to said housing, and
   (c) providing said device with a computing unit for measuring unbalance of said rotor, and for computing and indicating a size and direction of said unbalance;
   the improvement comprising the further steps of:
   (d) providing said device with a weight of known size mounted on said housing,
   (e) removing said weight from said housing,
   (f) mounting said weight at a predetermined axial and radial location on said clamping fixture, and
   (g) simultaneously with said step (e), automatically entering data corresponding to geometrical measurement of the position of said weight, as mounted on said clamping fixture, into said computing unit.

2. In the method of claim 1, further comprising the step of providing said computing unit with storage devices containing one of numerical and resistance values corresponding to said geometrical measurements of said position of said weight as mounted on said clamping fixture.

3. In a device for the balancing of a rotor in two balancing planes, said device including:
   a clamping fixture,
   a housing,
   pickup means for bracing said clamping fixture in relation to said housing, and for developing pickup signals corresponding to unbalance of said rotor, and
   computing means responsive to said pickup signals for computing and indicating a size and direction of said unbalance;
   a system for testing said device, wherein said device is provided with a weight of known size mounted on said housing, and wherein said known weight is removable from said housing and mountable on said clamping fixture at a predetermined axial and radial location thereon, and comprising automatic entering means responsive to removal of said weight from said housing for automatically entering data corresponding to geometrical measurement of the position of said weight as mounted on said clamping fixture into said computing means.

4. In the device of claim 3, wherein said device is provided with a bore, and said weight of known size comprises a closure for said bore.

5. In the device of claim 4, wherein said automatic entering means comprises a switch arrangement provided in said bore.

6. In the device of claim 5, wherein said automatic entering means further comprises a plurality of resistors having resistive values corresponding to said geometric measurement of the position of said weight as mounted on said clamping fixture, said switch arrangement being responsive to removal of said closure from said bore for automatically connecting said resistors to said computing means.

7. In the device of claim 4, wherein said pickup means comprises test data receivers providing voltages, said system further comprising adjustment means in said bore for adjusting said voltages supplied by said test data receivers.

8. In the device of claim 4, further comprising adjustment means in said bore for adjusting the indication of said size of said unbalance, as indicated by said computing means.

9. In the device of any one of claims 4 through 8, further comprising adjustment means in said bore for adjusting the indication of said direction of said unbalance as indicated by said computing means.

10. In the device of claim 9, wherein said weight has an external thread and said bore has an internal thread matching said external thread of said weight.

11. In the device of any one of claims 4 through 8, wherein said weight has an external thread and said bore has an internal thread matching said external thread of said weight.

12. In the device of claim 11, wherein said device comprises a switching bore, said bore being positioned within said switching bore.

13. In the device of claim 10, wherein said device comprises a switching bore, said bore being positioned within said switching bore.

14. In the device of claim 9, wherein said device comprises a switching bore, said bore being positioned within said switching bore.

15. In the device of any one of claims 4 through 8, wherein said device comprises a switching bore, said bore being positioned within said switching bore.

16. In the device of claim 11, wherein said clamping fixture has a bore, said weight being positionable in said bore.

17. In the device of claim 10, wherein said clamping fixture has a bore, said weight being positionable in said bore.

18. In the device of claim 9, wherein said clamping fixture has a bore, said weight being positionable in said bore.

19. In the device of any one of claims 4 through 8, wherein said clamping fixture has a bore, said weight being positionable in said bore.

* * * * *